Patented Oct. 21, 1924.

1,512,801

UNITED STATES PATENT OFFICE.

HENRY KNEELAND RICHARDSON, OF NEWARK, AND THEODORE MacLEAN SWITZ, OF EAST ORANGE, NEW JERSEY, ASSIGNORS TO WESTINGHOUSE LAMP COMPANY, A CORPORATION OF PENNSYLVANIA.

THORIA-CRUCIBLE PRODUCTION.

No Drawing.  Application filed August 28, 1923.  Serial No. 659,800.

*To all whom it may concern:*

Be it known that we, HENRY KNEELAND RICHARDSON, a citizen of the United States, and a resident of Newark, in the county of Essex and State of New Jersey, and THEODORE MacLEAN SWITZ, a citizen of the United States, and a resident of East Orange, in the county of Essex and State of New Jersey, have invented a new and useful Improvement in Thoria-Crucible Production, of which the following is a specification.

This invention pertains to refractory ware production and has particular reference to a method of producing highly refractory crucibles and the like.

It is an object of our invention to provide a method for economically and expeditiously producing crucibles, fire-brick and the like of a refractory material such as thoria or zirconia.

Another object is to devise a method whereby breakage and shrinkage of the article made thereby will be reduced to a minimum.

A further object is to produce pure or substantially pure thoria refractory ware.

Other objects will become readily apparent from the following description and claims.

To this end we have improved upon the process disclosed and claimed in a copending application of J. W. Marden, Serial No. 542,134, filed March 8, 1922, entitled Production of refractory oxide ware and assigned to the Westinghouse Lamp Company.

While the process disclosed in said copending application produces excellent refractory articles, we have found that shrinkage in the articles made in accordance therewith, may be materially reduced by replacing a portion of the new or unshrunk thoria of which the articles are composed with preshrunk thoria; that is, thoria which has been initially heated to a temperature sufficient to cause a substantial reduction in the volume thereof. This material is known as grog. A convenient source of supply of this grog or preshrunk thoria is from completely fired thoria ware which has developed effects or cracks in firing and is unfit for other use, although we do not desire to limit ourselves to this particular source of supply.

We have found that by utilizing this grog of thoria or of thoria and zirconia, and appropriate vacuum treatment of the slip before casting, that shrinkage and breakage may be reduced to a minimum.

In a preferred form our invention consists in preparing a slip of pure or substantially pure thoria, grog, made from cracked thoria ware that has been completely fired and ground to powder, cryolite or the like, such as a double halide salt, and if found desirable a reagent capable of developing an electrolytic action in the presence of water, and water. Zirconia may be added for the average refractory ware to give a well sintered body although it is not necessary to use it. Its chief value is to give a somewhat firmer casting and a slightly denser final product. Zirconia should not be used if molybdenum, tungsten or carbon be in contact with the refractory ware, as they react with it and produce objectionable results. Care should be exercised to avoid contamination of the materials to be treated in refractory crucibles by the inclusion of impurities, such as carbon, in any of the ingredients of the ware.

The grade of thoria to be used depends on the nature of the work as will be readily apparent and may vary between chemically pure thoria and grade B thoria which contains only about 95%+ thorium oxide. To this, the grog is added. This material, which may result from the pulverization of thoria crucibles which have developed cracks during the high temperature firing and have been completely shrunk by such firing, reduces shrinkage and has the property of giving greater rigidity to the cast article. It is necessary in order to reduce the shrinkage of the final product, that a certain percentage of grog be used to offset the high shrinkage of new thoria which may run as high as 50 or 60% by volume on heating to 1920° C.

The zirconia should be substantially pure, if used, and should run not less than 99% $ZrO_2$. The cryolite should be chemically pure and ball-milled to pass a 200 mesh screen. It is, next to thoria, the most fundamental ingredient and is added to suspend the particles of refractory oxide in the water solution, acting in this respect as if it were a colloid.

Any acid giving an electrolytic action with water and not harmful to the product may be used to coagulate any colloidal or extremely fine particles present and prevent clogging of the mold, but we prefer to use pure phosphoric anhydride for this purpose.

In a preferred form, we use the following proportions: 400 grams of thorium oxide, 200 grams of grog, 50 grams of cryolite, 50 grams of zirconium oxide and 300 grams of water with a small proportion of phosphoric anhydride, approximately 20 grams, which with water forms phosphoric acid to coagulate any colloidal particles present.

The grog may be varied between zero and 600 grams; the cryolite between 20 and 100 grams; zirconia between zero and 100 grams and the water between 300 and 600 grams, dependent upon the quality of the slip to be produced.

The above ingredients are mixed together and ball-milled overnight or for approximately 16 hours. Longer ball-milling may be objectionable, as it tends to make the particles too fine. The quantity of grog may be increased or decreased, to decrease or increase the shrinkage, respectively, but by increasing the quantity, the porosity of the resultant product is increased.

Pure thorium oxide crucibles have high shrinkage and are consequently of the greatest density. The cryolite may be decreased from the proportions given if necessary, but if increased, will suspend larger particles. The quantity of water used may be varied over wide ranges, but for very thin wall work, a large quantity may be recommended, while for thick wall work or heavy ware, it is desirable to decrease the quantity.

After the materials have been ball-milled, water may be added to the resultant slip to render it of any desired consistency. We have found that when the slip is made relatively thick, air bubbles are apt to form on stirring and cannot be easily removed. It is s netimes possible to remedy this condition y dilution. However, to insure a satisfactory product, we prefer to remove all entrained and dissolved air from the slip by placing it under a bell jar and gradually exhausting to approximately 29.5 inches of vacuum, until bubbles cease to rise. The volume of the slip when so treated is reduced from 6 to 8 per cent. As the resulting casting is much more dense, this treatment is recommended for all slips whether they apparently contain bubbles or not.

The slip thus formed, may be cast as described in application, Serial No. 542,134 above referred to, in molds constructed as disclosed therein also, but we prefer to make the mold pattern of brass or similar material for permanency and to cover it with a thin film of castile soap, so that it will not stick to the plaster of Paris matrix.

The plaster of Paris matrices or molds are composed of water and plaster in the proportion of one to one by weight and after being cast, are maintained in an oven at 50° C. with open dishes of water until ready for use. The water maintains the molds moist and prevents their cracking or clogging of the slip when poured into them.

The drying, preliminary firing and final firing are of particular importance, for should they be carelessly performed, cracked, warped and unusable, refractory ware results.

The refractory ware is dried one day each, in ovens at the following temperatures for each successive day: 30°, 50°, 70° and 90°. This avoids serious cracking.

The preliminary firing may be done in a Hevi-Duty electric furnace, wherein the ware is heated on a layer of pure zirconium oxide, as it tends to stick to or become contaminated by all other refractories that might be used in the furnace, and is preferably treated on a 30 hour schedule, reaching 800° C. at the end of 7 or 8 hours, which temperature is maintained over night and raised to 1000 or 1100° C. at the end of 7 or 8 hours. A one day schedule of preliminary firing may be resorted to but the extent and amount of distortion of the ware thus treated becomes proportionately greater.

The final firing is completed in 7 or 8 hours in a gas fired, fused magnesia lined furnace, as thorium oxide sticks to, or is contaminated by the exudations from other materials. The temperature is gradually raised until 1920° C. or a #40 Seger cone is reached. A carbonaceous atmosphere, as produced by carbon electric furnaces, causes the formation of carbides and deleteriously affects the resultant product, so it is essential that an oxidizing atmosphere be maintained for the final firing.

It may be desirable in commercial practice, that all firing i. e., the preliminary and final firing, should be done in a single gas furnace on a two day schedule, thus doing away with electricity as a fuel and double handling.

It will be apparent that many departures may be made from the process as outlined above without departing from the spirit of the invention or the scope of the claims appended.

What is claimed is:

1. As a slip for casting refractory ware, a mixture of thoria, grog, a medium adapted to serve as a colloid, a reagent capable of developing an electrolytic action in the presence of water, and water.

2. As a slip for casting refractory ware, a mixture of incompletely shrunk thoria, grog, zirconia, a medium adapted to serve as a colloid, a reagent capable of developing an electrolytic action in the presence of water, and water.

3. As a slip for casting refractory ware, a homogeneous mixture of incompletely shrunk thoria, grog, a medium adapted to serve as a colloid, a reagent capable of developing an electrolytic action in the presence of water, in the proportion of 40, 20, 5 and 2 parts respectively, and water to the desired consistency.

4. The method of treating cast thoria ware comprising, drying for a predetermined time at temperatures from 30 to 90° C., preliminarily firing said ware in a furnace up to about 800° C. at the end of about 8 hours, maintaining said last named temperature for approximately 15 hours and raised to approximately 1100° C. at the end of about 8 hours, the total firing hours being about 30 and finally firing in an oxidizing atmosphere for about 8 hours to 1920° C.

5. The method of treating cast thoria ware comprising, drying for about 24 hours at each of the temperatures 30°, 50°, 70° and 90° C., preliminarily firing said ware with gradually increasing temperature to 800° C. at the end of about 8 hours, maintaining said latter temperature for about 15 hours and then gradually raising the temperature to about 1100° C. at the end of about 8 hours, said firing hours being in total about 30, and finally firing at gradually increasing temperatures up to 1920° C. over a period of about 8 hours.

6. The method of making thoria ware comprising, forming a slip of a salt, an acid, and water with finely divided thoria, treating said slip to remove any gases therein, casting said slip in predetermined form, drying the cast article and firing.

7. The method of making thoria ware comprising forming a slip of a salt, an acid and water with finely divided thoria, treating said slip under a vacuum to remove any gases therein, casting said slip in predetermined form, drying the article so cast and firing.

8. The method of making thoria ware comprising forming a slip of a salt, an acid and water with finely divided thoria, treating said slip under a vacuum to remove any gases therein, casting said slip to a predetermined form, drying at temperatures up to 90° C. for a predetermined time and firing at temperatures increasing in predetermined periods up to approximately 1920° C.

9. The method of making thoria ware comprising forming a slip of a salt, an acid and water with finely divided thoria, treating said slip under a vacuum to remove any gases therein, casting said slip to a predetermined form, drying at temperatures up to 90° C. for a predetermined time and firing for approximately 30 hours at temperatures increasing in definite periods successively to approximately 800° C., 1100° C. and 1900° C.

10. The method of making thoria ware, comprising forming a slip of thorium oxide, grog, a double halide salt adapted to serve as a colloid, a reagent capable of developing an electrolytic action in water, and water, subjecting said slip to a vacuum to exhaust any gases therein and casting.

11. The method of making thoria ware comprising forming a slip of thorium oxide, grog, a double halide salt adapted to serve as a colloid, a reagent capable of developing an electrolytic action in water, and water, subjecting said slip to a vacuum, casting said slip in predetermined form, drying and firing said form under gradually increasing temperatures.

12. The method of making thoria ware comprising forming a slip of thorium oxide, grog, a double halide salt adapted to serve as a colloid, a reagent capable of developing an electrolytic action in water, and water, subjecting said slip to a vacuum, casting said slip in predetermined form, drying and firing at temperatures increasing in predetermined steps up to approximately 1920° C.

13. The method of making thoria ware comprising forming a slip of thorium oxide, grog, a double halide salt adapted to serve as a colloid, a reagent capable of developing an electrolytic action in water, and water, subjecting said slip to a vacuum, casting said slip in predetermined form, drying and firing for approximately 30 hours at temperatures increasing in definite periods successively to approximately 800° C., 1100° C. and 1900° C.

14. The method of making thoria ware comprising forming a slip by adding a salt, an acid and water to finely divided thoria, treating said slip to remove any gases, casting said slip in predetermined form, removing the excess slip from the form, drying and firing the cast form.

15. The method of making thoria ware comprising forming a slip by adding a salt, an acid and water to finely divided thoria, treating said slip to remove any gases, casting said slip in predetermined form, drying and firing at temperatures increasing in predetermined steps up to approximately 1920° C.

16. The method of making thoria ware comprising forming a slip by adding a salt, an acid and water to finely divided thoria, treating said slip to remove any gases, casting said slip in predetermined form, removing the excess slip from the form, drying and firing for approximately 30 hours at temperatures increasing in definite periods successively to approximately 800° C., 1100° C. and 1900° C.

17. The method of making thoria ware comprising, forming a slip of thorium oxide, grog, a small portion of zirconia, a double halide salt adapted to serve as a colloid, a reagent capable of developing electrolytic action in water, and water, subjecting said slip to a vacuum to exhaust any gases therein and casting.

18. The method of making thoria ware comprising, forming a slip of thorium oxide, grog, a small portion of zirconia, a double halide salt adapted to serve as a colloid, a reagent capable of developing electrolytic action in water, and water, subjecting said slip to a vacuum to exhaust any gases therein, casting, drying and firing at temperatures increasing in predetermined steps up to approximately 1920° C.

19. The method of making thoria ware comprising, forming a slip of thorium oxide, grog, a small portion of zirconia, a double halide salt adapted to serve as a colloid, a reagent capable of developing electrolytic action in water, and water, subjecting said slip to a vacuum to exhaust any gases therein, casting, drying and firing for approximately 30 hours at temperatures increasing in definite periods successively to approximately 800° C., 1100° C. and 1900° C.

20. The method of making thoria ware comprising, forming a slip by ball milling thorium oxide, grog, a small portion of zirconia, a double halide salt adapted to serve as a colloid, a reagent capable of developing an electrolytic action in water, and water for a predetermined time, subjecting said slip to a vacuum to exhaust any gases therein, and casting.

21. The method of making thoria ware comprising, forming a slip by ball milling thorium oxide, grog, a small portion of zirconia, a double halide salt adapted to serve as a colloid, a reagent capable of developing an electrolytic action in water, and water, for a predetermined time, subjecting said slip to a vacuum to exhaust any gases therein, casting, drying and firing at temperatures increasing in predetermined steps up to approximately 1920° C.

22. The method of making thoria ware comprising, forming a slip by ball milling thorium oxide, grog, a small portion of zirconia, a double halide salt adapted to serve as a colloid, a reagent capable of developing an electrolytic action in water, and water, for a predetermined time, subjecting said slip to a vacuum to exhaust any gases therein, casting, drying and firing for approximately 30 hours at temperatures increasing in definite periods successively to approximately 800° C., 1100° C. and 1900° C.

In testimony whereof, we have hereunto subscribed our names this 27th day of August, 1923.

HENRY KNEELAND RICHARDSON.
THEODORE MacLEAN SWITZ.